Figure 1:
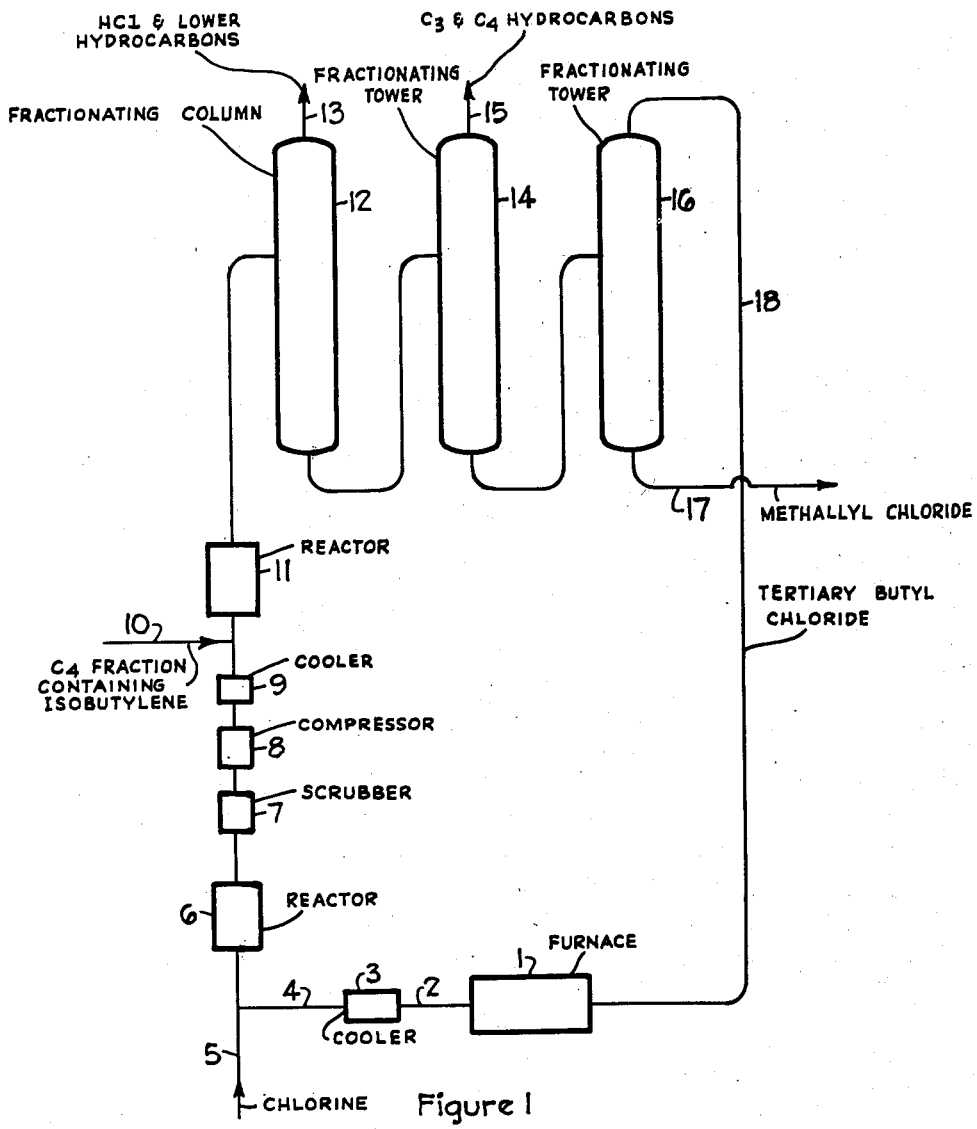

Sept. 30, 1952     A. J. CHERNIAVSKY ET AL     2,612,530
PRODUCTION OF METHALLYL CHLORIDE
Filed Dec. 21, 1948     2 SHEETS—SHEET 2
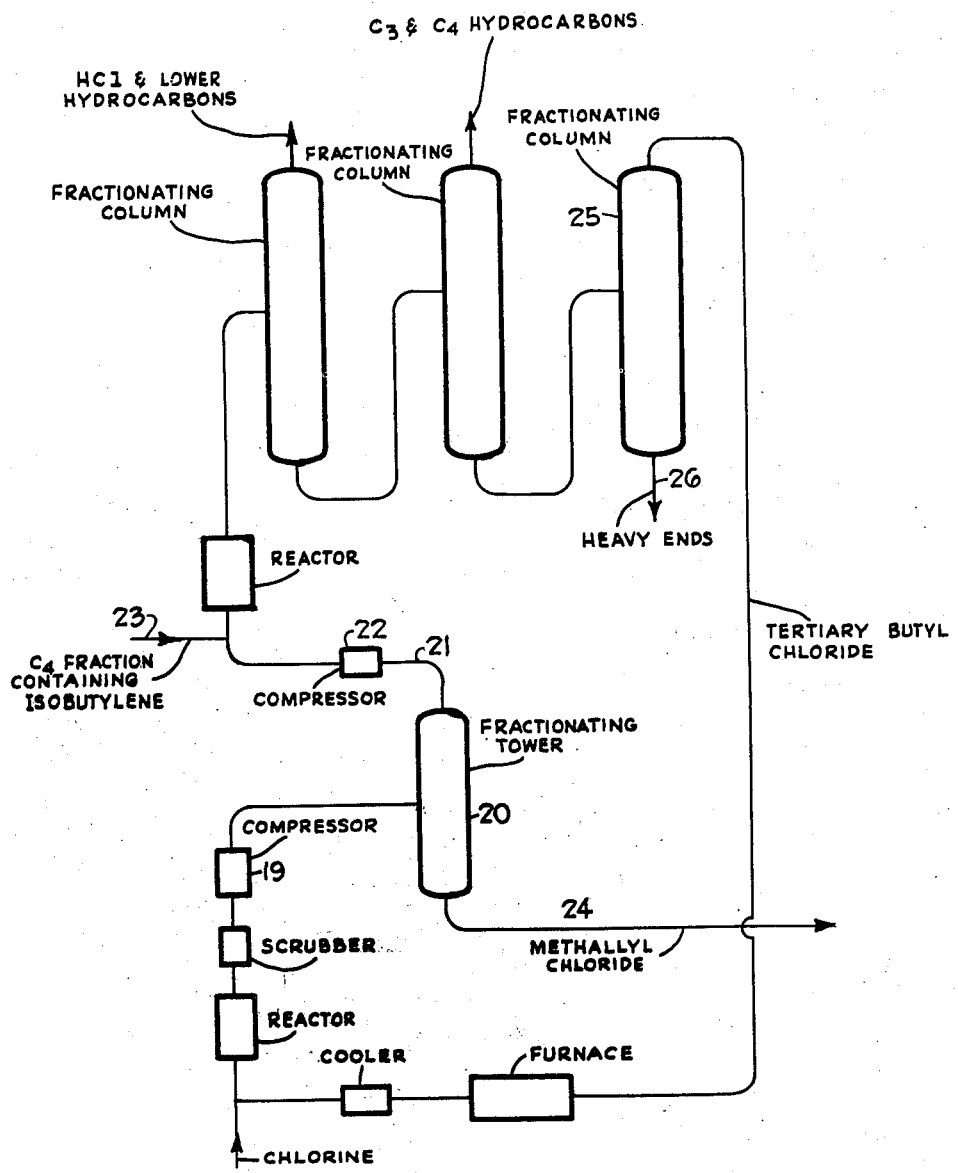
Figure II
Inventors:
   Alexander J. Cherniavsky
   David Brown
By    *C. J. Ott*
   their Attorney Patented Sept. 30, 1952

2,612,530

UNITED STATES PATENT OFFICE 2,612,530

PRODUCTION OF METHALLYL CHLORIDE

Alexander J. Cherniavsky, San Francisco, and David Brown, Mill Valley, Calif., assignors to Shell Development Company, San Francisco, Calif., a corporation of Delaware Application December 21, 1948, Serial No. 66,464

11 Claims. (Cl. 260—654)

1

This invention relates to the production of methallyl chloride. More particularly the invention relates to a process for the preparation of methallyl chloride from isobutylene or hydrocarbon mixtures containing the same.

Specifically the invention provides a practical and highly economical process for the production of methallyl chloride in large yields from isobutylene or hydrocarbon mixtures containing isobutylene which comprises heating tertiary butyl chloride at a temperature above 300° C. for a short period of time, cooling the resulting product, and reacting it with chlorine at a temperature between 0° C. and 300° C. to form the desired methallyl chloride and hydrogen chloride, adding isobutylene or a hydrocarbon mixture containing isobutylene to the effluent of this reaction and maintaining the resulting mixture under such conditions that the hydrogen chloride reacts with the isobutylene to form tertiary butyl chloride, separating the tertiary butyl chloride from the resulting mixture and recycling it to the first step of the process, and recovering the methallyl chloride as the desired product.

Methallyl chloride is a versatile raw material for many chemical syntheses. Derivatives may be obtained either by replacing the highly reactive chlorine atom or by additions or substitutions involving the unsaturated linkage. Various methods have been employed in the past for the production of this compound but most of them have met with such technical difficulties or have employed such expensive reactants and equipment that they have proved to be unfeasible for use in producing the said compound on a large commercial scale. Producing the methallyl chloride by the direct chlorination, via substitution, of isobutylene is not too satisfactory because the isobutylene employed in the process must be in a relatively pure form. This is a considerable disadvantage as the relatively pure isobutylene is difficult to obtain. Furthermore, in this process the isobutylene must be maintained in excess and this results in the formation of a reaction mixture containing both isobutylene and hydrogen chloride. In order to prevent the combination of these two compounds the mixture must be quenched rapidly with water. This step requires the use of expensive scrubbing towers and prevents the collection of the hydrogen chloride in the anhydrous state. In addition, drying of the product is difficult so that expensive corrosion-resistant equipment must be employed in the final separation of the desired product.

It is an object of the invention, therefore, to provide a practical and highly economical method for the production of methallyl chloride. It is a further object to provide a method for the production of methallyl chloride from isobutylene which utilizes a mixture of hydrocarbons containing isobutylene. It is a further object of the invention to provide a method for the production of methallyl chloride from isobutylene which avoids the use of expensive scrubbing towers and corrosion-resistant separation equipment. It is a further object of the invention to provide a method for the production of methallyl chloride from isobutylene which will yield hydrogen chloride in a substantially anhydrous form. It is a further object of the invention to provide a method for the production of methallyl chloride from isobutylene which yields high, relatively pure yields of the desired product. Other objects and advantages of the invention will be apparent from the detailed description given hereinafter.

It has now been discovered that these and other objects may be accomplished by the process of the invention which comprises heating tertiary butyl chloride at a temperature above 300° C. for a short period of time, cooling the resulting product and reacting it with a chlorine at a temperature between 0° C. and 300° C. to form the desired methallyl chloride and hydrogen chloride, adding isobutylene or a hydrocarbon mixture containing isobutylene to the effluent of this chlorination reaction and maintaining the resulting mixture under such conditions that the hydrogen chloride reacts with the isobutylene to form tertiary butyl chloride, separating the tertiary butyl chloride from the mixture and recycling it to the first step of the process, and recovering the methallyl chloride as the desired product.

The isobutylene used in the process may be in the relatively pure form or it may be isobutylene in admixture with other hydrocarbons. For economic reasons, however, it is more desirable to utilize the impure mixtures of isobutylene in the process. Such mixtures can be obtained from any suitable source, such as from the cracking of natural gas, petroleum, coal tar, pitches, peat, shale oil, and the like or related carbonaceous material. The more preferred isobutylene-containing hydrocarbon mixtures to be used in the process are the $C_4$ fractions obtained by the cracking of petroleum. $C_4$ fractions of this type having an isobutylene content of from 5 to 30 mole per cent are the more preferred. The $C_4$ fraction will usually contain other hydrocarbons such as 1-butene, n-butane, isobutane, 1,3-butadiene, and 2-butene, in addition to isobutylene, but the addition of these and similar hydrocarbons with the said isobutylene does not interfere with the operation of the process.

The process of the invention may be broadly described as consisting of four distinct phases or steps. The first step, hereinafter referred to as the preheat step, comprises heating tertiary butyl chloride at a temperature above 300° C. for a short period of time. The second step, hereinafter referred to as the chlorination step, comprises chlorinating the product of the preheat step at a temperature between 0° C. and 300° C. to form methallyl chloride and hydrogen chloride. The third step, hereinafter referred to as the hydrochlorination step, comprises reacting the reaction mixture of the chlorination step with isobutylene or a hydrocarbon mixture containing isobutylene so that hydrogen chloride and isobutylene will combine to form tertiary butyl chloride. The fourth step, hereinafter referred to as the separation step, comprises separating tertiary butyl chloride and recycling it to the first step of the process and recovering the methallyl chloride as the desired product.

The tertiary butyl chloride employed in the preheat step may be obtained from any source but is preferably the tertiary butyl chloride obtained by a previous operation of the process of the invention. The temperature employed in this step may be any temperature above 300° C. but is preferably a temperature between 350° C. and 500° C. The tertiary butyl chloride is heated at this high temperature for only a relatively short period of time. The exact period of heating will depend in each case upon the initial temperature employed. If the temperature employed in the preheat step is in the vicinity of 300° C., for example, the period of heating will vary in most cases from about 5 minutes to 15 minutes. When the high temperatures are employed the residence period will be much shorter, e. g. between 0.1 second to 5 minutes. With the preferred range of temperatures the residence period will usually vary between 1 second and 3 minutes.

The products of the preheat step are rapidly cooled to a temperature between 0° C. and 300° C., preferably between 50° C. and 125° C. The cooling may be accomplished by any of the conventional means. If a liquid is employed in the said means it is desirable to utilize liquids other than water, such as pentane, in order to prevent the possibility of leakage of water into the process.

After cooling, the vapors are reacted with chlorine to produce methallyl chloride and hydrogen chloride. This chlorination step is essentially a low temperature vapor phase reaction and is accomplished at temperatures between 0° C. and 300° C., preferably between 50° C. and 125° C.

For most satisfactory results the addition of reactants is regulated so that the moles of tertiary butyl chloride fed into the preheater will be in excess of the moles of chlorine added to the cooled vapors. Exceptionally fine results are obtained when the mole ratio of tertiary butyl chloride fed into the preheater to chlorine is maintained between 1.5:1 and 10:1.

The period for the chlorination reaction may vary over a considerable range depending upon the ratio of reactants, temperature employed, etc. It is usually preferred to conduct the chlorination in as short a period as possible, but the reaction may be extended for longer periods without seriously impairing the operation of the process. In general, the residence periods for the chlorination reaction will extend from 0.1 second to 5 minutes, preferably between 0.1 second and 1 minute.

Atmospheric, superatmospheric or subatmospheric pressure may be used in the chlorination reaction. Superatmospheric pressures of between 0 to 100 pounds per square inch gauge produce satisfactory results and are usually preferred.

Isobutylene or a hydrocarbon mixture containing isobutylene is then added to the effluent of the chlorination reaction and the resulting mixture maintained under such condition that the hydrogen chloride contained in the said effluent reacts with the isobutylene to form tertiary butyl chloride. As this hydrochlorination reaction is preferably conducted in the liquid state it is usually desirable to cool and condense the effluent of the chlorination reaction so that a substantial portion of it is in the liquid state before the said effluent is mixed with the isobutylene. The condensation may be accomplished by any suitable chemical or mechanical means, such as refrigeration and internal cooling agents. In some cases it may be desirable to compress the effluent of the chlorination reaction to aid in the condensation.

In order to fully utilize all the isobutylene in the feed it is desirable to maintain the hydrogen chloride in the chlorination reaction products in excess of the added isobutylene. The reaction proceeds very satisfactorily, however, when the isobutylene is maintained in excess. Particularly preferred mole ratios of hydrogen chloride to isobutylene vary between 1:1 and 4:1. In a continuous cyclic operation isobutylene need only be introduced in sufficient amount to produce tertiary butyl chloride at the rate at which it is consumed in the chlorination reaction, which will ordinarily result in a mole ratio of hydrogen chloride to isobutylene of about 2:1.

The reaction between the isobutylene and the hydrogen chloride is preferably conducted in the liquid phase. The reaction is known to take place at temperatures as low as −80° C., but the more preferred temperatures range from −40° C. to +80° C. The reaction between the isobutylene and hydrogen chloride is exothermic and produces large quantities of heat. It will, therefore, be necessary in most cases and particularly in those cases where the isobutylene is employed in the process in relatively pure form to employ some cooling means to maintain the reaction at the desired temperature. The cooling may be accomplished by any suitable means, such as external or internal cooling coils, and the like. In those cases where the hydrocarbon mixtures are employed as the source of the isobutylene the other hydrocarbons contained therein will assist in absorbing and dispersing the heat of reaction and in maintaining a liquid phase in the reactor.

Pressures employed in the hydrochlorination reaction are those required to maintain a substantial portion of the reaction mixture in the preferred liquid phase. Preferred pressures range from about 100 pounds per square inch gauge to about 500 pounds per square inch gauge.

Catalysts may be employed in the hydrochlorination reaction if desired, but they are usually not necessary as the reaction proceeds efficiently under the above-specified conditions.

The residence time for the hydrochlorination reaction will vary according to the ratio and particular type of reactants employed, and the quantity of other materials present. In general, the residence time may vary from 10 seconds to about 1 hour. Preferred residence periods vary between 1 minute and 20 minutes.

The products of the hydrochlorination reaction will consist mainly of methallyl chloride, tertiary butyl chloride, the residual hydrocarbons remaining from the hydrocarbon fraction, if the isobutylene was introduced in a mixture, excess hydrogen chloride and small quantities of the higher chlorinated products. Small quantities of secondary butyl chloride are also produced. In the final step of the process these products are separated from the reaction mixture and the methallyl chloride collected as the desired product. The products are preferably separated by the use of a series of fractional distillations. According to this method the hydrogen chloride and the lighter hydrocarbons are removed overhead in the first fractionation. In the second fractionation the $C_3$ and $C_4$ hydrocarbons are removed overhead. This second column may be eliminated if the isobutylene is utilized in the process in a relatively pure form and not as a $C_4$ fraction. In the third fractionation the tertiary butyl chloride is removed overhead and the methallyl chloride is recovered from the bottoms of the last distillation. This methallyl chloride may be readily purified by conventional methods. The hydrogen chloride recovered in the first separation may be recovered from the lighter hydrocarbons and used commercially as anhydrous hydrogen chloride. The residual hydrocarbons recovered in the second separation may be employed for various alkylation processes.

The apparatus employed in the process of the invention may be of any suitable construction or material so as to enable each of the specified steps to be accomplished according to the above-described specified conditions.

The process may be conducted in a batchwise, continuous or semi-continuous manner. The process is particularly adapted to, and is preferably conducted as, a continuous process wherein the tertiary butyl chloride recovered at the end of the process is recycled to the preheat step.

To illustrate more or less diagrammatically how the novel process of the invention may be applied to the production of methallyl chloride, reference is made to the accompanying drawing, Figure I, showing an assemblage of apparatus for the production of methallyl chloride from a butane-butylene fraction obtained by the cracking of petroleum. The drawing is attached as an example and should not be regarded as limiting the invention in any way.

Referring to Figure I, tertiary butyl chloride, preferably obtained by a previous operation of the process, is heated in furnace 1 at a temperature of 450° C. for approximately 1 second. The product of this preheat step is then conducted through line 2 to cooler 3 wherein the said product is reduced to a temperature of about 100° C. From the cooler the product is taken through line 4 and mixed with chlorine introduced through line 5. The flow of chlorine is regulated so that there is about 1 mole of chlorine for every 1 to 4 moles of tertiary butyl chloride introduced into the furnace.

The mixed reactants then pass into the chlorination reactor 6 which is maintained at a temperature of about 100° C. The products of this reaction are sent to scrubber 7 to remove the solids and tarry materials and then compressed at compressor 8 and cooled at cooler 9. The reaction products are then mixed with a stream of $C_4$ butane-butylene mixture from conduit 10. The flow of the $C_4$ fraction is regulated to maintain an adequate supply of tertiary butyl chloride for the chlorination step. The resulting mixture is then taken to reactor 11 which is cooled by suitable means to remove the heat of reaction formed by the addition of the hydrogen chloride to the isobutylene. After completion of the hydrochlorination reaction the mixture is taken to fractionating column 12 where the hydrogen chloride and lower hydrocarbons are removed through line 13. The bottoms are taken to fractionating tower 14 where the $C_3$ and $C_4$ hydrocarbons are taken off overhead through line 15. Methallyl chloride is recovered from line 17 at the bottom of tower 16, and tertiary butyl chloride is taken off overhead and recycled to furnace 1 through line 18.

An alternative but less preferred method for operating the process of the invention consists of separating the methallyl chloride formed in the chlorination reaction from reaction mixture before the isobutylene or hydrocarbon mixture containing isobutylene is introduced. Figure II showns an assemblage of apparatus for the production of methallyl chloride by this alternative method. The process is conducted in the same manner as described for the flow shown in Figure I with the exception that the products of the chlorination reaction compressed at 19 are conducted to fractionating tower 20 and the methallyl chloride separated at a low pressure of about 45 pounds per square inch gauge. The methallyl chloride is recovered through line 24. The hydrogen chloride-containing products are taken off overhead through line 21 and compressed at compressor 22 before being mixed with the $C_4$ fraction from line 23. Hydrogen chloride, the $C_3$ and $C_4$ hydrocarbons and tertiary butyl chloride are recovered as in the above-described process. Secondary butyl chloride and heavy ends are removed from the bottoms of fractionating tower 25 through line 26.

The actual production of methallyl chloride by the process of the invention is illustrated in the following examples. It is to be understood that the examples are for the purpose of illustration and the invention is not to be regarded as limited to any of the specific conditions recited therein.

*Example I*

Methallyl chloride is produced according to the process of the invention with an assemblage of apparatus similar to that shown in Figure I. Tertiary butyl chloride obtained from a previous operation of the process is heated in the furnace at a temperature of 450° C. and pressure of 10 p. s. i. g. The required residence time at 450° C. is less than 1 second. The furnace effluent is then cooled to 100° C. in a single-pass cooler using pentane as the cooling medium. After cooling, the product of the preheat step is mixed with chlorine which has been previously vaporized. The flow of chlorine is regulated so that there is about 1 mole of chlorine for every 1.7 moles of tertiary butyl chloride fed into the furnace. After mixing, the reactants are passed into a tubular reactor maintained at 100° C. The residence time for the chlorination reaction in this chamber is about 1 second. The product of this reaction is then sent to the scrubber to remove the tarry material and cooled and compressed to about 240 p. s. i. g. The cooled and compressed products are then mixed with a stream of liquid C₄ hydrocarbons containing 25 mole per cent isobutylene. The isobutylene feed is regulated so that there is about 1.4 moles of hydrogen chloride in the resulting mixture for every mole of isobutylene. After the mixing the reactants are passed into the hydrochlorination reactor. The temperature in this reactor is lowered by means of water cooling and is maintained at a temperature of about 62° C. A pressure of about 235 p. s. i. g. is maintained to keep the reactor effluent in the liquid phase. The liquid residence time is about 5 minutes. The products of this reaction are then separated by means of a series of fractional distillations. The excess hydrogen chloride and lower boiling hydrocarbons are taken off overhead in the first fractionation. The C₃ and C₄ hydrocarbons are taken off overhead at the next fractionation, and in the third fractionation the tertiary butyl chloride is taken off overhead and the methallyl chloride recovered as bottoms. Further fractionation of the bottoms produces relatively methallyl chloride.

*Example II*

Methallyl chloride is produced according to the process of the invention with an assemblage of apparatus shown in Figure II. Tertiary butyl chloride is heated in the furnace to a temperature of about 310° C. and pressure of 10 p. s. i. g. The required residence time at this temperature is less than 2 minutes. The furnace effluent is then cooled to 90° C. After cooling, the product of the preheat step is mixed with chlorine which has been previously vaporized. The flow of chlorine is regulated so that there is about 1 mole of chlorine for every 2.5 moles of tertiary butyl chloride fed into the furnace. After the mixing the reactants are passed into a tubular reactor maintained at 90° C. The residence time for the chlorination reaction in this chamber is about 1.3 seconds. The product of this reaction is then sent to the scrubber to remove the tarry material and compressed at the compressor to about 45 p. s. i. g. The compressed product is then taken to fractionating tower and the methallyl chloride separated at the low pressure. The hydrogen chloride and other products are taken off overhead while the methallyl chloride is collected as the bottoms of the fractionation. The product taken overhead is compressed and then mixed with a stream of C₄ hydrocarbons containing 15% isobutylene. The isobutylene feed is regulated so that there is about 1.2 to 2.0 moles of hydrogen chloride in the reaction mixture per mole of isobutylene. After the mixing the reactants are passed into the hydrochlorination reactor. The temperature in this reactor is lowered by means of water cooling and is maintained at a temperature of about 40° C. A pressure of 200 p. s. i. g. is maintained to keep the reactor effluent in the liquid phase. The liquid residence time is about 5 minutes. The products of this reaction are then separated by means of a series of fractional distillations. The excess hydrogen chloride and lower boiling hydrocarbons are taken off overhead in the first fractionation. The C₃ and C₄ hydrocarbons are taken off overhead at the next fractionation. In the third fractionation the tertiary butyl chloride is taken off overhead and recycled to the chlorination step and the heavy ends are recovered as bottoms of the last fractionation.

We claim as our invention:

1. A process for producing methallyl chloride which comprises heating tertiary butyl chloride at 450° C. for a period less than 1 second, cooling the resulting product to 100° C., adding chlorine thereto in such quantities that there will be 1 mole of chlorine for every 2 moles of tertiary butyl chloride heated at 450° C., maintaining the resulting mixture in vapor state at 100° C. for a period of 0.1 second to 1 minute, cooling and compressing the resulting product, adding isobutylene to the compressed product in such an amount that the hydrogen chloride contained in the said product and the added isobutylene are in the ratio of 2:1, maintaining this mixture in the liquid phase at 62° C. for a period of 5 minutes, subjecting the resulting mixture to fractional distillation to remove the excess hydrogen chloride overhead, subjecting the bottoms to another fractional distillation to remove tertiary butyl chloride overhead, recycling the tertiary butyl chloride to the first step, and recovering methallyl chloride from the bottoms of the last fractionation.

2. A process for producing methallyl chloride which comprises heating tertiary butyl chloride at a temperature between 350° C. and 500° C. for a period of from 0.1 second to 5 minutes, cooling the resulting product to a temperature between 0° C. and 300° C., adding chlorine thereto in such quantities that there will be 1 mole of chlorine for every 1 to 10 moles of tertiary butyl chloride heated between 350° C. and 500° C., maintaining the resulting mixture in the vapor state at a temperature between 0° C. and 300° C. for a short period, cooling and compressing the resulting product, adding a stream of C₄ liquid hydrocarbons containing isobutylene to the compressed product in such an amount that the hydrogen chloride contained in the said product and the added isobutylene are in a ratio between 0.5:1 and 8:1, maintaining the mixture in the liquid phase at a temperature between −40° C. and +80° C. for a period of about 10 seconds to 10 minutes, subjecting the resulting mixture to fractional distillation to remove the excess hydrogen chloride and lower boiling hydrocarbons overhead, subjecting the bottoms to another fractional distillation to remove the C₃ and C₄ hydrocarbons overhead, and subjecting the bottoms of the second distillation to another fractional distillation to remove the tertiary butyl chloride overhead, recycling the tertiary butyl chloride to the first step, and recovering the methallyl chloride from the bottoms of the last fractionation.

3. A process for producing methallyl chloride which comprises heating tertiary butyl chloride at a temperature above 300° C. for a period not in excess of 15 minutes, cooling the resulting product to a temperature between 0° C. and 300° C., adding chlorine thereto in such quantities that there will be 1 mole of chlorine for every 1 to 10 moles of tertiary butyl chloride heated above 300° C., maintaining the resulting mixture at a temperature between 0° C. and 300° C. for a short period, compressing the resulting product and subjecting it to a low pressure distillation, recovering the methallyl chloride from the bottoms of the distillation, compressing the overhead product of the distillation and adding thereto a stream of C₄ liquid hydrocarbons containing isobutylene, maintaining this mixture in the liquid phase at a temperature between −40° C. and +80 C. for a period of about 10 seconds to 1 hour, subjecting the resulting mixture to fractional distillation to remove the excess hydrogen chloride and lower hydrocarbons overhead, subjecting the bottoms to fractional distillation to remove the $C_3$ and $C_4$ hydrocarbons overhead, and subjecting the bottoms of the second distillation to fractional distillation to remove the tertiary butyl chloride overhead and recycling the tertiary butyl chloride to the first step of the process.

4. A process for producing methallyl chloride which comprises heating tertiary butyl chloride at a temperature above 300° C. for a short period, cooling the resulting product to a temperature between 0° C. and 300° C., mixing the cooled product with chlorine vapor, maintaining the resulting mixture in the vapor state at a temperature between 0° C. and 300° C. for a short period, adding a mixture of liquid hydrocarbons containing isobutylene to the resulting product, allowing the resulting mixture to react in the liquid phase whereby the isobutylene is hydrochlorinated to tertiary butyl chloride, separating out the excess hydrogen chloride and residual hydrocarbons, subsequently separating out the tertiary butyl chloride and recycling it to the first step of the process, and recovering the methallyl chloride.

5. A process for producing methallyl chloride which comprises heating tertiary butyl chloride at a temperature above 300° C. for a short period, cooling the resulting product to a temperature between 0° C. and 300° C., mixing the cooled product with chlorine vapor, maintaining the resulting mixture in the vapor state at a temperature between 0 and 300° C. for a short period, separating out the methallyl chloride formed by this reaction, to the reaction mixture that remains adding a mixture of liquid hydrocarbons containing isobutylene, allowing the resulting mixture to react in the liquid phase, separating out the tertiary butyl chloride formed in this reaction and recycling it to the first step of the process.

6. A process for producing methallyl chloride which comprises heating tertiary butyl chloride at a temperature above 300° C. for a short period, cooling the resulting product and mixing it with chlorine vapor, maintaining the resulting mixture in the vapor state at a temperature between 0° C. and 300° C. for a short period, adding a member of the group consisting of substantially pure isobutylene and liquid hydrocarbon mixtures containing isobutylene to the resulting product and allowing the resulting mixture to react in the liquid phase, separating out tertiary butyl chloride from the resulting mixture and recycling it to the first step of the process, the methallyl chloride being recovered from the reaction mixture any time after the chlorination step.

7. A process for producing methallyl chloride which comprises heating tertiary butyl chloride at a temperature above 300° C. for a period not in excess of 15 minutes, cooling the product to a temperature between 0° C. and 300° C., adding chlorine thereto in such quantities that there will be 1 mole of chlorine for every 1 to 10 moles of tertiary butyl chloride heated above 300° C., and maintaining the mixture in the vapor state at a temperature between 0° C. and 300° C. for a short period.

8. A process for producing methallyl chloride which comprises heating tertiary butyl chloride at a temperature above 300° C. for a short period, cooling the resulting product and mixing it with chlorine vapor, and maintaining the resulting mixture in the vapor state at a temperature between 0° C. and 300° C.

9. A process for producing methallyl chloride which comprises heating tertiary butyl chloride at a temperature above 300° C. for from 0.1 second to 15 minutes, cooling the resulting product to a temperature between 0° C. and 300° C., mixing the cooled product with chlorine vapor, maintaining the resulting mixture in the vapor state at a temperature between 0° C. and 300° C. for from 0.1 second to 5 minutes, adding a mixture of liquid hydrocarbons containing isobutylene to the resulting product, allowing the combined mixture to react in the liquid phase whereby the isobutylene is hydrochlorinated to tertiary butyl chloride, separating out the excess hydrogen chloride and residual hydrocarbons, subsequently separating out the tertiary butyl chloride and recycling it to the first step of the process, and recovering the methallyl chloride.

10. A process as defined in claim 9 wherein the tertiary butyl chloride is preheated at a temperature between 350° C. and 500° C. for a period of from 0.1 second to 5 minutes.

11. A process as defined in claim 9 wherein the chlorination of the preheated product is accomplished at a temperature between 50° C. and 125° C.

ALEXANDER J. CHERNIAVSKY.
DAVID BROWN.

REFERENCES CITED

The following references are of record in the file of this patent:

UNITED STATES PATENTS

| Number | Name | Date |
|---|---|---|
| 2,077,382 | Engs et al. | Apr. 20, 1937 |
| 2,368,446 | Buc | Jan. 30, 1945 |
| 2,410,647 | Flemming et al. | Nov. 5, 1946 |
| 2,418,093 | Perkins et al. | Mar. 25, 1947 |